(12) United States Patent
Isono et al.

(10) Patent No.: US 10,933,741 B2
(45) Date of Patent: Mar. 2, 2021

(54) VEHICULAR PROPELLER SHAFT

(71) Applicant: TOYOTA JIDOSHA KABUSHIKI KAISHA, Toyota (JP)

(72) Inventors: Tatsuya Isono, Toyota (JP); Kouki Kawarada, Toyota (JP); Atsushi Mori, Nagoya (JP); Atsuo Mikazuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 15/995,464

(22) Filed: Jun. 1, 2018

(65) Prior Publication Data

US 2018/0354360 A1 Dec. 13, 2018

(30) Foreign Application Priority Data

Jun. 7, 2017 (JP) .............................. JP2017-112985

(51) Int. Cl.
*B60K 17/22* (2006.01)
*B60R 19/26* (2006.01)
*F16C 3/02* (2006.01)
*F16C 3/00* (2006.01)

(52) U.S. Cl.
CPC .............. *B60K 17/22* (2013.01); *B60R 19/26* (2013.01); *F16C 3/00* (2013.01); *F16C 3/02* (2013.01); *B60Y 2306/01* (2013.01); *F16C 2240/30* (2013.01); *F16C 2326/06* (2013.01)

(58) Field of Classification Search
CPC ... B60K 17/22; F16C 3/00; F16C 3/02; F16C 2240/30; F16C 2326/06; B60R 19/26; B60Y 2306/01

USPC ............................................ 464/183; 280/777
See application file for complete search history.

(56) References Cited

U.S. PATENT DOCUMENTS

| | | | |
|---|---|---|---|
| 5,566,777 A | 10/1996 | Trommer et al. | |
| 6,371,859 B1* | 4/2002 | Gibson | F16C 3/02 464/183 |
| 7,285,052 B1* | 10/2007 | Rowell | F16C 3/02 464/183 |
| 2011/0124421 A1 | 5/2011 | Kienhofer et al. | |
| 2017/0057349 A1* | 3/2017 | Ogawa | F16H 57/037 |

FOREIGN PATENT DOCUMENTS

| | | |
|---|---|---|
| CN | 106476536 A | 3/2017 |
| DE | 4227967 A1 | 3/1994 |
| DE | 102015015728 A1 | 5/2016 |
| EP | 0839681 A2 | 5/1998 |
| JP | S63-002725 A | 1/1988 |
| JP | H06-278554 A | 10/1994 |

(Continued)

*Primary Examiner* — Greg Binda
(74) *Attorney, Agent, or Firm* — Oliff PLC

(57) ABSTRACT

A vehicular propeller shaft is configured to transmit a rotational force output from a drive force source to drive wheels. The vehicular propeller shaft includes a stepped pipe-shaped member including a compressive load weakest part with respect to an axial compressive load of the vehicular propeller shaft and a torsional load weakest part with respect to a torsional load around an axis of the vehicular propeller shaft. The compressive load weakest part and the torsional load weakest part are positioned apart from each other in a radial direction of the stepped pipe-shaped member.

4 Claims, 7 Drawing Sheets

(56) References Cited

FOREIGN PATENT DOCUMENTS

| | | |
|---|---|---|
| JP | 2006-175938 A | 7/2006 |
| JP | 2007-203751 A | 8/2007 |
| WO | 2005/054693 A1 | 6/2005 |

* cited by examiner

FIG. 6

| SAMPLE NUMBER | FIRST TAPER ANGLE a | PIPE COMPRESSION RATE b | PIPE COMPRESSION PORTION R RATE c | NOTCH RATE d | MAXIMUM COMPRESSIVE STRESS | | | MAXIMUM TORSIONAL STRESS | | |
|---|---|---|---|---|---|---|---|---|---|---|
| | | | | | SMALL DIAMETER SIDE | LARGE DIAMETER SIDE | DETERMINATION | SMALL DIAMETER SIDE | LARGE DIAMETER SIDE | DETERMINATION |
| 1 | aa | b1 | c1 | d1 | p11 | p12 | | r11 | r12 | ○ |
| 2 | aa | b1 | c1 | d2 | p21 | p22 | | r21 | r22 | ○ |
| 3 | aa | b1 | c2 | d1 | p31 | p32 | | r31 | r32 | ○ |
| 4 | aa | b1 | c2 | d2 | p41 | p42 | | r41 | r42 | ○ |
| 5 | aa | b2 | c1 | d1 | p51 | p52 | | r51 | r52 | ○ |
| 6 | aa | b2 | c1 | d2 | p61 | p62 | | r61 | r62 | ○ |
| 7 | aa | b2 | c2 | d1 | p71 | p72 | ○ | r71 | r72 | |
| 8 | ab | b2 | c2 | d2 | p81 | p82 | ○ | r81 | r82 | |
| 9 | ab | b1 | c1 | d1 | p91 | p92 | ○ | r91 | r92 | ○ |
| 10 | ab | b1 | c1 | d2 | p101 | p102 | ○ | r101 | r102 | |
| 11 | ab | b1 | c2 | d1 | p111 | p112 | ○ | r111 | r112 | ○ |
| 12 | ab | b1 | c2 | d2 | p121 | p122 | ○ | r121 | r122 | |
| 13 | ab | b2 | c1 | d1 | p131 | p132 | ○ | r131 | r132 | ○ |
| 14 | ab | b2 | c1 | d2 | p141 | p142 | ○ | r141 | r142 | |
| 15 | ab | b2 | c2 | d1 | p151 | p152 | ○ | r151 | r152 | ○ |
| 16 | ab | b2 | c2 | d2 | p161 | p162 | ○ | r161 | r162 | ○ |

VEHICULAR PROPELLER SHAFT

INCORPORATION BY REFERENCE

The disclosure of Japanese Patent Application No. 2017-112985 filed on Jun. 7, 2017 including the specification, drawings and abstract is incorporated herein by reference in its entirety.

BACKGROUND

1. Technical Field

The present disclosure relates to a vehicular propeller shaft and, more particularly, to a technique for improving vehicle safety and maintaining a sufficient rotational torque capacity at the same time.

2. Description of Related Art

Known with regard to a compression pipe for absorbing collision energy during a collision of a vehicle is a technique for absorbing collision energy during a collision of a vehicle by designing a bent portion to buckle, that is, undergo deformation in the direction of the collision as a result of the impact during the collision of the vehicle. Examples thereof include the vehicular compression pipe that is disclosed in Japanese Unexamined Patent Application Publication No. 6-278554 (JP 6-278554 A). In the vehicular compression pipe disclosed in JP 6-278554 A, a notch decreasing the plate thickness of a planned breaking place of a bent portion is formed so that the impact force during a collision of a vehicle can be alleviated. Also disclosed in JP 6-278554 A is that the related art is applicable to vehicular propeller shafts as well.

SUMMARY

By a notch being formed in a planned breaking place of a vehicular propeller shaft, the axial load at which buckling of the planned breaking place during a collision in the forward direction and the reverse direction of a vehicle is initiated is decreased. As a result, the axial load during the collision of the vehicle is reduced. In a case where the axial load during the collision of the vehicle is to be further reduced by the formation of the notch in the planned breaking place of the vehicular propeller shaft, however, the allowable value of rotational torque transmitted from a drive force source to a rear portion wheel via the vehicular propeller shaft, that is, a rotational torque capacity may also be reduced by the notch. As a result, it is difficult to improve safety based on a decrease in the axial load at which the buckling of the planned breaking place during the collision of the vehicle is initiated and maintain a sufficient rotational torque capacity during driving of the vehicle at the same time.

The present disclosure provides a vehicular propeller shaft with which safety can be improved based on a decrease in the axial load at which breaking of a planned breaking place, that is, buckling during a collision of a vehicle is initiated and a sufficient rotational torque capacity can be maintained during driving of the vehicle at the same time.

An aspect of the present disclosure relates to a vehicular propeller shaft. The vehicular propeller shaft is configured to transmit a rotational force output from a drive force source to drive wheels. The vehicular propeller shaft includes a stepped pipe-shaped member including a compressive load weakest part with respect to an axial compressive load of the vehicular propeller shaft and a torsional load weakest part with respect to a torsional load around an axis of the vehicular propeller shaft. The compressive load weakest part and the torsional load weakest part are positioned apart from each other in a radial direction of the stepped pipe-shaped member.

In the vehicular propeller shaft according to the aspect of the present disclosure, the stepped pipe-shaped member may include a small diameter pipe portion having a predetermined outer diameter, a large diameter pipe portion having an outer diameter exceeding the outer diameter of the small diameter pipe portion, and a first tapered pipe portion connecting the small diameter pipe portion and the large diameter pipe portion to each other, the compressive load weakest part may be positioned on the large diameter pipe portion side of the first tapered pipe portion, and the torsional load weakest part may be positioned on the small diameter pipe portion side of the first tapered pipe portion.

In the vehicular propeller shaft according to the aspect of the present disclosure, a groove-shaped circumferential direction notch disposed in an outer peripheral surface of the first tapered pipe portion on the large diameter pipe portion side may constitute the compressive load weakest part.

In the vehicular propeller shaft according to the aspect of the present disclosure, the stepped pipe-shaped member may be configured to satisfy the following Formula 1 and Formula 2 in a plane including a center line of the vehicular propeller shaft, $$0 < 1.95 + 0.0880 \times a + 708 \times b - 96.7 \times c + 232 \times d - 8.79 \times a \times b + 0.562 \times a \times c + 0.0150 \times a \times d + 188 \times b \times c - 560 \times b \times d - 1.0 \times c \times d \quad \quad 1$$

$$0 < -627 + 7.63 \times a + 3{,}420 \times b - 18.6 \times c + 8.84 \times d - 44.5 \times a \times b + 5.11 \times a \times c + 9.25 \times a \times d - 402 \times b \times c - 2{,}100 \times b \times d - 728 \times c \times d \quad \quad 2$$

in which a represents a first taper angle as an angle between the center line of the vehicular propeller shaft and a part of the first tapered pipe portion forming a straight line or a tangent to an inflection point in a curve portion of the first tapered pipe portion, b represents a pipe compression rate determined as 1−(small diameter pipe portion outer diameter/large diameter pipe portion outer diameter), c represents a pipe compression portion R rate determined as boundary portion radius/circumscribed radius, the boundary portion radius is a curvature radius of a boundary portion arc circumscribing a straight line showing an outer peripheral surface of the large diameter pipe portion and a curve showing the outer peripheral surface of the first tapered pipe portion, the circumscribed radius is a curvature radius of an arc circumscribing a first midpoint and a first contact point, the first midpoint is a midpoint between a base point and a first intersection point when an intersection point between the tangent to the first tapered pipe portion and an extension line of a straight line showing an outer peripheral surface of the small diameter pipe portion is the base point and an intersection point between the tangent to the first tapered pipe portion and an extension line of the straight line showing the outer peripheral surface of the large diameter pipe portion is the first intersection point, the first contact point is a point apart from the base point toward the outer peripheral surface of the small diameter pipe portion by a length from the base point to the first midpoint, and d represents a notch rate determined as a plate thickness of the circumferential direction notch/a plate thickness of the stepped pipe-shaped member other than the circumferential direction notch.

In the vehicular propeller shaft according to the aspect of the present disclosure, the stepped pipe-shaped member may include a medium diameter pipe portion having an outer diameter exceeding the outer diameter of the small diameter pipe portion and smaller than the outer diameter of the large diameter pipe portion and a second tapered pipe portion connecting the large diameter pipe portion and the medium diameter pipe portion to each other on the large diameter pipe portion side. A second taper angle of the stepped pipe-shaped member may be smaller than the first taper angle, the first taper angle may be an angle between the center line of the vehicular propeller shaft and the part of the first tapered pipe portion forming the straight line or the tangent to the inflection point in the curve portion of the first tapered pipe portion, and the second taper angle may be an angle between the center line of the vehicular propeller shaft and a part of the second tapered pipe portion forming a straight line or the tangent to the inflection point in a curve portion of the second tapered pipe portion.

According to the aspect of the present disclosure, the vehicular propeller shaft is the vehicular propeller shaft configured to transmit the rotational force output from the drive force source to the drive wheels, the vehicular propeller shaft includes the stepped pipe-shaped member including the compressive load weakest part with respect to the axial compressive load of the vehicular propeller shaft and the torsional load weakest part with respect to the torsional load around the axis of the vehicular propeller shaft, and the compressive load weakest part and the torsional load weakest part are positioned apart from each other in the radial direction of the stepped pipe-shaped member. With the aspect of the present disclosure, an axial load at which plastic deformation and buckling of a place determined in advance during a collision of a vehicle are initiated is reduced. Accordingly, safety can be improved and the rotational torque capacity during driving of the vehicle can be maintained at the same time.

According to the aspect of the present disclosure, the stepped pipe-shaped member includes the small diameter pipe portion having the predetermined outer diameter, the large diameter pipe portion having the outer diameter exceeding the outer diameter of the small diameter pipe portion, and the first tapered pipe portion connecting the small diameter pipe portion and the large diameter pipe portion to each other, the compressive load weakest part is positioned on the large diameter pipe portion side of the first tapered pipe portion, and the torsional load weakest part is positioned on the small diameter pipe portion side of the first tapered pipe portion. With the aspect of the present disclosure, safety can be improved based on a decrease in the axial load at which plastic deformation and buckling of a place determined in advance during a collision of the vehicle are initiated and the rotational torque capacity needed during driving of the vehicle can be sufficiently maintained at the same time.

According to the aspect of the present disclosure, the groove-shaped circumferential direction notch disposed in the outer peripheral surface of the first tapered pipe portion on the large diameter pipe portion side constitutes the compressive load weakest part. With the aspect of the present disclosure, a reduction in the axial load at which plastic deformation and buckling of a place determined in advance during a collision of the vehicle are initiated can be easily achieved and safety can be further enhanced.

According to the aspect of the present disclosure, the stepped pipe-shaped member is configured to satisfy the following Formula 1 and Formula 2 in a plane including the center line of the vehicular propeller shaft, $$0<1.95+0.0880 \times a+708 \times b-96.7 \times c+232 \times d-8.79 \times a \times b+0.562 \times a \times c+0.0150 \times a \times d+188 \times b \times c-560 \times b \times d-1.0 \times c \times d \quad (1)$$

$$0<-627+7.63 \times a+3{,}420 \times b-18.6 \times c+8.84 \times d-44.5 \times a \times b+5.11 \times a \times c+9.25 \times a \times d-402 \times b \times c-2{,}100 \times b \times d-728 \times c \times d \quad (2)$$

in which a represents the first taper angle as the angle between the center line of the vehicular propeller shaft and the part of the first tapered pipe portion forming the straight line or the tangent to the inflection point in the curve portion of the first tapered pipe portion, b represents the pipe compression rate determined as 1−(small diameter pipe portion outer diameter/large diameter pipe portion outer diameter), c represents the pipe compression portion R rate determined as boundary portion radius/circumscribed radius, the boundary portion radius is the curvature radius of the boundary portion arc circumscribing the straight line showing the outer peripheral surface of the large diameter pipe portion and the curve showing the outer peripheral surface of the first tapered pipe portion, the circumscribed radius is the curvature radius of the arc circumscribing the first midpoint and the first contact point, the first midpoint is the midpoint between the base point and the first intersection point when the intersection point between the tangent to the first tapered pipe portion and the extension line of the straight line showing the outer peripheral surface of the small diameter pipe portion is the base point and the intersection point between the tangent to the first tapered pipe portion and the extension line of the straight line showing the outer peripheral surface of the large diameter pipe portion is the first intersection point, the first contact point is the point apart from the base point toward the outer peripheral surface of the small diameter pipe portion by the length from the base point to the first midpoint, and d represents the notch rate determined as the plate thickness of the circumferential direction notch/the plate thickness of the stepped pipe-shaped member other than the circumferential direction notch. With the aspect of the present disclosure, an axial load at which plastic deformation and buckling of a place determined in advance during a collision of a vehicle are initiated is reduced. Accordingly, safety can be improved and the rotational torque capacity during driving of the vehicle can be maintained at the same time.

According to the aspect of the present disclosure, the stepped pipe-shaped member includes the medium diameter pipe portion having the outer diameter exceeding the outer diameter of the small diameter pipe portion and smaller than the outer diameter of the large diameter pipe portion and the second tapered pipe portion connecting the large diameter pipe portion and the medium diameter pipe portion to each other on the large diameter pipe portion side. The second taper angle of the stepped pipe-shaped member is smaller than the first taper angle. The first taper angle is the angle between the center line of the vehicular propeller shaft and the part of the first tapered pipe portion forming the straight line or the tangent to the inflection point in the curve portion of the first tapered pipe portion, and the second taper angle is the angle between the center line of the vehicular propeller shaft and the part of the second tapered pipe portion forming the straight line or the tangent to the inflection point in the curve portion of the second tapered pipe portion. With the aspect of the present disclosure, the outer diameter of the large diameter pipe portion is allowed to easily exceed the outer diameter of the other part of the propeller shaft and the outer diameter of the large diameter pipe portion is allowed to be larger than in a case where the large diameter pipe portion is directly connected to a propeller shaft rear portion. Accordingly, the axial load at which plastic deformation and buckling of a place determined in advance are initiated can be decreased. Therefore, safety can be further enhanced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 6 is a table showing a change in stress distribution in a case where the dimensions of a large diameter pipe portion, the first tapered pipe portion, and a small diameter pipe portion illustrated in FIG. 5 are changed.

DETAILED DESCRIPTION OF EMBODIMENTS

Hereinafter, examples of the present disclosure will be described in detail with reference to accompanying drawings. In the following examples, the drawings are appropriately simplified or modified, and the dimension ratio, the shape, and so on of each portion are not always accurately drawn.

Figure 1:
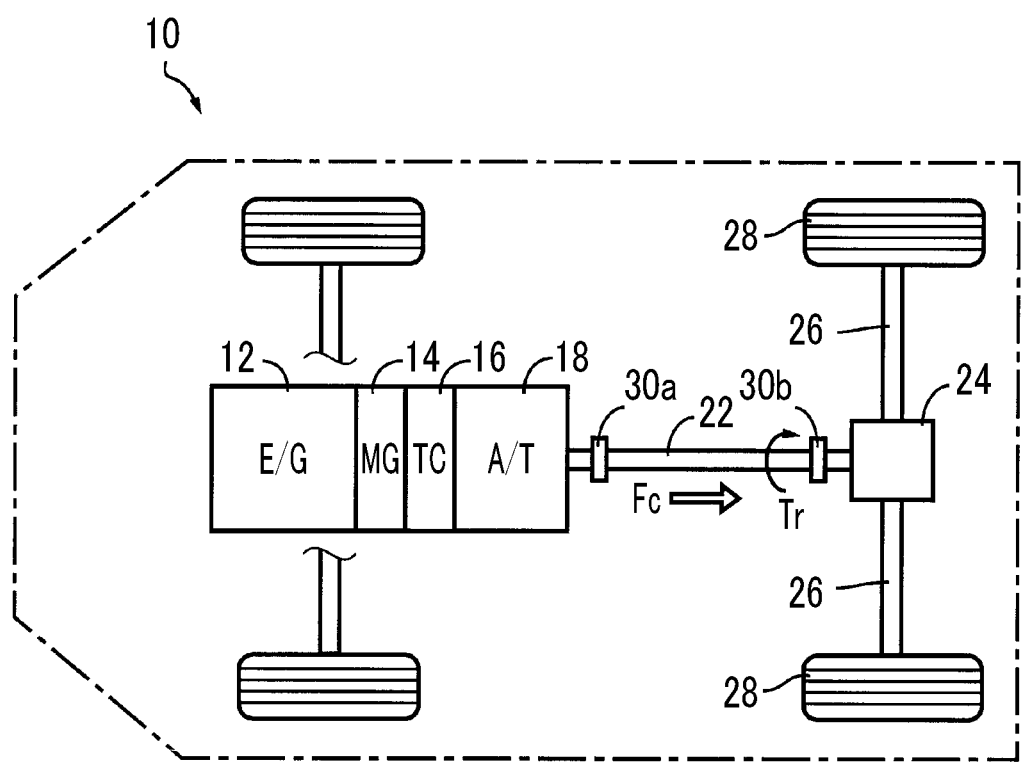
FIG. 1 is a diagram illustrating a schematic configuration of a vehicle to which a propeller shaft according to an embodiment of the present disclosure is applied and is a diagram illustrating a schematic position of the propeller shaft in the vehicle.

FIG. 1 is a schematic diagram illustrating the drive train of a hybrid vehicle 10 to which the present disclosure is applied. In FIG. 1, the vehicle 10 is a front engine rear drive (FR) vehicle and is provided with an engine 12 that is an internal combustion engine such as a gasoline engine and a diesel engine as a drive force source for traveling and a motor generator 14 that functions as an electric motor and a generator as drive force sources. The output of the engine 12 and the motor generator 14, that is, a rotational force is transmitted to an automatic transmission 18 from a torque converter 16 that is a fluid type power transmission device, and then is transmitted to a differential gear device 24 via a vehicular propeller shaft 22. Then, right and left drive wheels 28 are driven by an axle 26 rotating.

Figure 2:
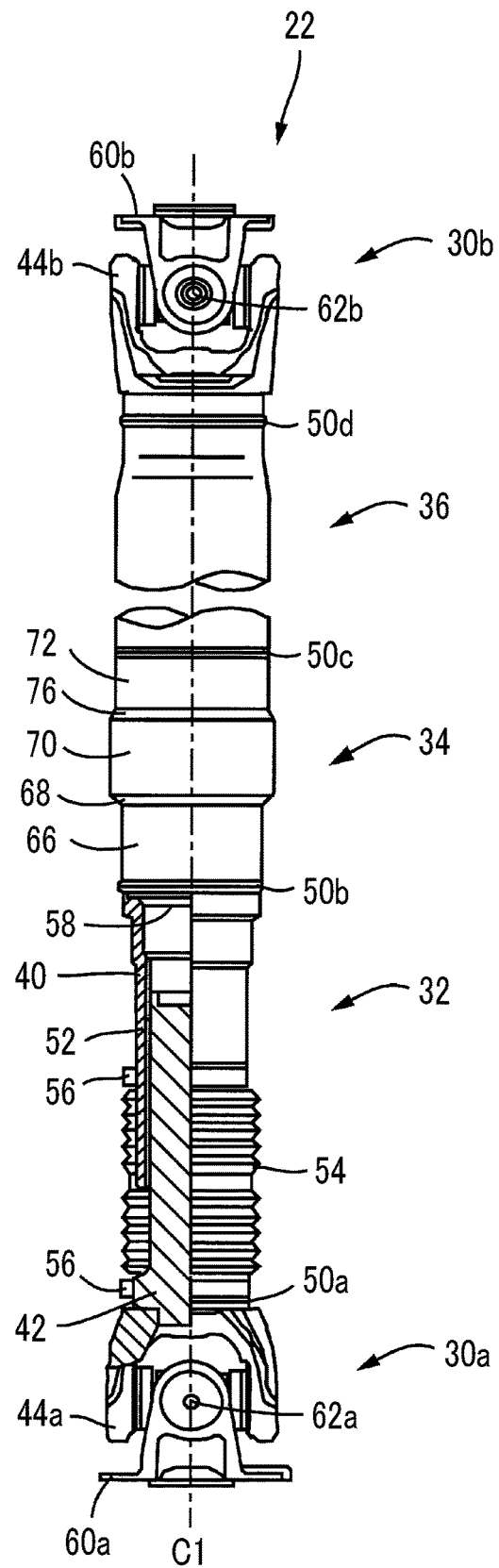
FIG. 2 is a diagram illustrating an example of the propeller shaft disposed in the vehicle illustrated in FIG. 1.

FIG. 2 is a diagram illustrating the vehicular propeller shaft 22 to which the present disclosure is applied. The vehicular propeller shaft 22 is composed of a propeller shaft front portion 32, a propeller shaft intermediate portion 34 corresponding to a stepped pipe-shaped member, and a propeller shaft rear portion 36. The propeller shaft front portion 32 is connected to an output shaft (not illustrated) of the automatic transmission 18 by a first universal fitting 30a. The propeller shaft rear portion 36 is connected to an input shaft (not illustrated) of the differential gear device 24 by a second universal fitting 30b.

The first universal fitting 30a is composed of a yoke 44a constituting a part of the propeller shaft front portion 32, a yoke 60a connected to the output shaft of the automatic transmission 18, and a cross shaft 62a connecting the yoke 44a and the yoke 60a to each other in a rotatable manner. The yoke 44a and a spline shaft portion 42 are integrally fixed and welded by a first welding portion 50a. The second universal fitting 30b is composed of a yoke 44b constituting a part of the propeller shaft rear portion 36, a yoke 60b connected to the input shaft of the differential gear device 24, and a cross shaft 62b connecting the yoke 44b and the yoke 60b to each other in a relatively rotatable manner. The yoke 44b and the propeller shaft rear portion 36 are integrally fixed and welded by a fourth welding portion 50d. The first universal fitting 30a and the second universal fitting 30b are capable of transmitting the rotation that is input to the vehicular propeller shaft 22 from the automatic transmission 18 to the differential gear device 24 even in a case where the drive wheels 28 move up and down depending on road surface states, that is, even in a case where the vehicular propeller shaft 22 is inclined. Even in a case where the drive wheels 28 move up and down, the movement results in an angle change in an input shaft (not illustrated) of the first universal fitting 30a and the vehicular propeller shaft 22, and the angle change results in a change in the rotation speed of the first universal fitting 30a, the change in the rotation speed of the first universal fitting 30a can be offset by an angle change conflicting with the angle change described above occurring in an output shaft (not illustrated) of the second universal fitting 30b and the vehicular propeller shaft 22.

The propeller shaft front portion 32 is composed of a spline tube portion 40 that has spline teeth (not illustrated) on an inner peripheral side and the spline shaft portion 42 that has spline teeth (not illustrated) on an outer peripheral side. The spline tube portion 40 and the spline shaft portion 42 are interconnected in a spline fitting portion 52 to be relatively movable in the axial direction of a center line C1 of the vehicular propeller shaft 22 and relatively non-rotatable around the radial direction of the center line C1. A part of the outer periphery of the spline tube portion 40 and the spline shaft portion 42 is covered by a bellows-shaped seal member 54 stretchable in the axial direction of the center line C1 of the vehicular propeller shaft 22. Each of both ends of the seal member 54 in the center line C1 direction is fixed by a fastening member 56. The seal member 54 has a function to prevent any foreign matter from entering the spline fitting portion 52 between the spline tube portion 40 and the spline shaft portion 42 from the outside. Each fitting plate 58 is fixed to the end portion of the spline tube portion 40 on the propeller shaft intermediate portion 34 side in a second welding portion 50b.

The spline tube portion 40 is formed by needed plastic working and machining for step and spline tooth formation being performed on a hollow and cylindrical carbon steel pipe material such as S43C and S45C and then a quenching treatment being performed on needed parts. The spline shaft portion 42 is formed by needed plastic working and machining for step and spline tooth formation being performed on a columnar carbon steel pipe material such as S43C and S45C and then a quenching treatment being performed on needed parts. The spline shaft portion 42 is integrally fixed and welded to the yoke 44a constituting a part of the first universal fitting 30a by welding. The spline tube portion 40 is integrally fixed and welded to the propeller shaft intermediate portion 34 by welding.

The propeller shaft rear portion 36 is long in the axial direction of the center line C1 and has, for example, a hollow cylindrical shape although this is not illustrated in the drawing. The yoke 44b constituting the second universal fitting 30b is integrally fixed and welded to the long and hollow cylinder by welding. A high tensile steel pipe material that is a material which has a high strength compared to weight is used for the propeller shaft rear portion 36 because the propeller shaft rear portion 36 is a part to which a strong torque is applied and because the propeller shaft rear portion 36 occupies a large part of the vehicular propeller shaft 22 especially in the axial direction length of the center line C1 of the vehicular propeller shaft 22 and, as such, the fuel consumption of the vehicle 10 is reduced when the weight of the propeller shaft rear portion 36 is reduced. In general, a decrease in rigidity can be suppressed, the fuel consumption of the vehicle 10 can be improved, and a needed strength can be responded to by a relatively simple structure such as a cylindrical structure that has no large step being adopted.

The propeller shaft intermediate portion 34 is at a position where the propeller shaft front portion 32 and the propeller shaft rear portion 36 are interconnected. The propeller shaft intermediate portion 34 and the propeller shaft rear portion 36 are integrally fixed and welded to each other by welding. The propeller shaft intermediate portion 34 is composed of a small diameter pipe portion 66, a large diameter pipe portion 70, and a medium diameter pipe portion 72 that have different diameters in the radial direction of the center line C1 of the vehicular propeller shaft 22, a first tapered pipe portion 68 that integrally connects the small diameter pipe portion 66 and the large diameter pipe portion 70 to each other, and a second tapered pipe portion 76 that connects the large diameter pipe portion 70 and the medium diameter pipe portion 72 to each other. Welding methods such as friction welding and arc welding are selected based on demands related to the materials of members and processing accuracy during welding in the vehicular propeller shaft 22 such as welding of the spline shaft portion 42 and the yoke 44a in the first welding portion 50a, welding of the spline tube portion 40 and the propeller shaft intermediate portion 34 in the second welding portion 50b, welding of the propeller shaft intermediate portion 34 and the propeller shaft rear portion 36 in a third welding portion 50c, and welding of the propeller shaft rear portion 36 and the yoke 44b in the fourth welding portion 50d.

First Example

Figure 3:
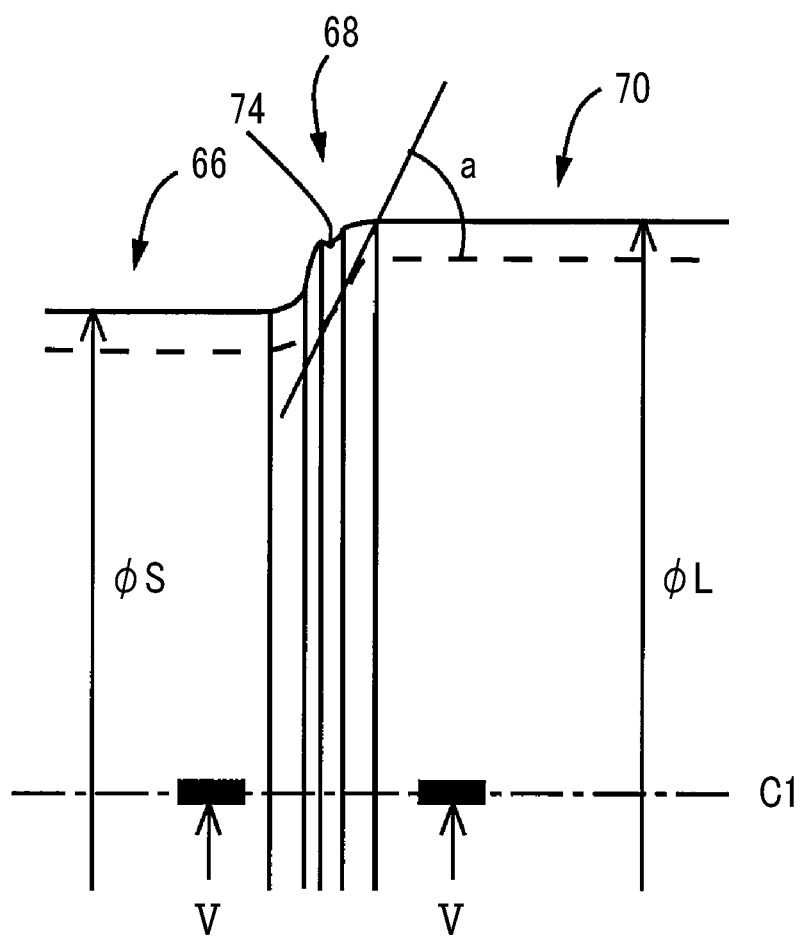
FIG. 3 is a diagram in which a part of the outer shape of a pipe-shaped member used in the propeller shaft illustrated in FIG. 2 is illustrated as an example, the outer shape including a circumferential direction notch.

FIG. 3 is an enlarged view of the small diameter pipe portion 66 that has a small diameter pipe portion outer diameter ϕS, the large diameter pipe portion 70 that has a large diameter pipe portion outer diameter ϕL exceeding the outer diameter ϕS of the small diameter pipe portion 66, and the first tapered pipe portion 68. In FIG. 3, a part of the propeller shaft intermediate portion 34 is illustrated in the form of a half cylinder including the center line C1. A notch portion 74 corresponding to a circumferential direction notch is continuously formed in the circumferential direction of the vehicular propeller shaft 22 in the end portion of the first tapered pipe portion 68 on the large diameter pipe portion 70 side. A first taper angle a is shown as the angle between a tangent to the inner diameter of the first tapered pipe portion 68 and the inner diameter of the large diameter pipe portion 70 indicated by a dashed line, and the first taper angle a is the angle between the inner diameter of the large diameter pipe portion 70 and a part of a tangent to the first tapered pipe portion 68 forming a straight line or a tangent to an inflection point in a curve portion of the first tapered pipe portion 68. The small diameter pipe portion 66 and the large diameter pipe portion 70 form a cylindrical shape and the center line C1 is the central axis of the cylindrical shape, and thus the angles between the center line C1 of the vehicular propeller shaft 22 and tangents to the inner diameter and the outer diameter of the first tapered pipe portion 68 indicate the first taper angle a as well.

Figure 4:
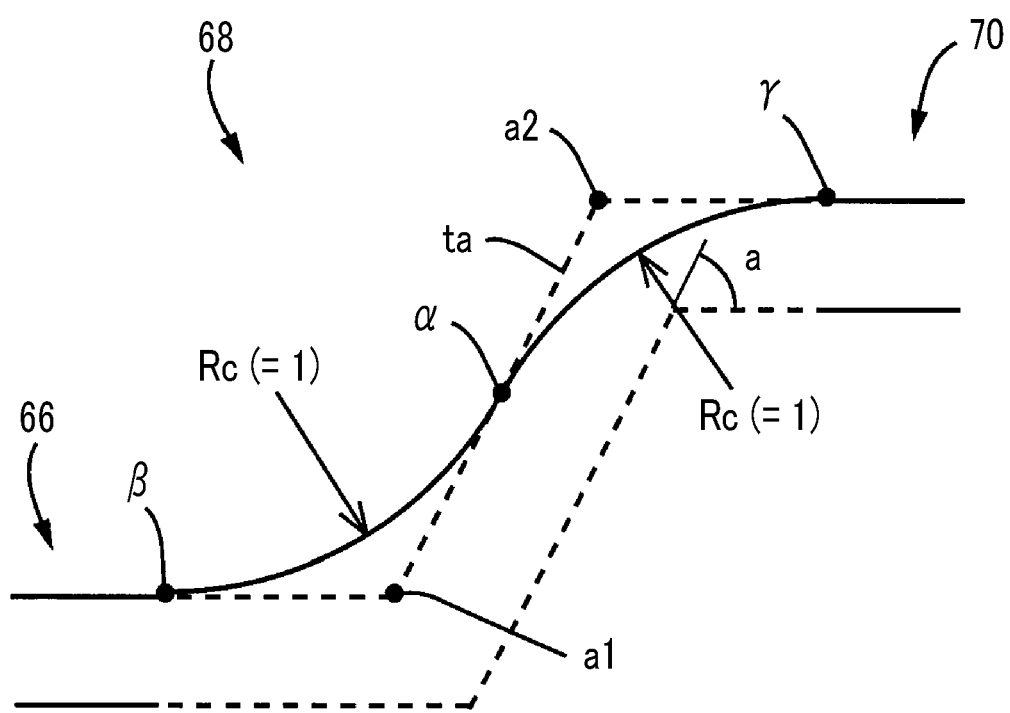
FIG. 4 is a diagram in which a section in a case where the curvature radius of a first tapered pipe portion of the propeller shaft illustrated in FIG. 3 is maximized is illustrated as an example and in an enlarged manner.

Illustrated in FIG. 4 is an outer shape in a case where circumscribed radii Rc are given as the maximum curvature radius of the curved surface between the end portion of the first tapered pipe portion 68 on the large diameter pipe portion side and the end portion of the first tapered pipe portion 68 on the small diameter pipe portion side. The outline that is indicated by a dashed line includes a tangent ta to the inflection point in the curve portion including the two circumscribed radii Rc that have different directions, the outline (straight line) that shows the outer periphery of the large diameter pipe portion 70, and the outline (straight line) that shows the outer periphery of the outer diameter of the small diameter pipe portion 66, the intersection point between the tangent ta and the outline (straight line) showing the outer peripheral surface of the large diameter pipe portion 70 is a first intersection point a2, and the intersection point between the tangent ta and the outline (straight line) showing the outer peripheral surface of the small diameter pipe portion 66 is a base point a1. A first midpoint α is the inflection point in the curve portion including the two circumscribed radii Rc that have the different directions and form the outer shape of the first tapered pipe portion 68 indicated by a solid line, and the first midpoint α is positioned in the middle between the first intersection point a2 and the base point a1. A first contact point β on the small diameter pipe portion 66 side is a contact point between the outline (straight line) of the small diameter pipe portion 66 and the outline (arc) of the first tapered pipe portion 68 and is a contact point of the circumscribed radius Rc that is the maximum curvature radius which can be formed as the outer shape of the first tapered pipe portion 68. A second contact point α on the large diameter pipe portion 70 side is a contact point between the outline (straight line) of the large diameter pipe portion 70 and the outline (arc) of the first tapered pipe portion 68 and is a contact point of the circumscribed radius Rc that is the maximum curvature radius which can be formed as the outer shape of the first tapered pipe portion 68. Furthermore, the distance from the first midpoint α to the base point a1 is equal to the distance between the first contact point β on the small diameter pipe portion 66 side and the base point a1. The distance from the first midpoint α to the first intersection point a2 is equal to the distance between the second contact point γ on the large diameter pipe portion 70 side and the first intersection point a2. In FIG. 4, which shows a longitudinal section including the center line C1, the first tapered pipe portion 68 is between the first contact point β and the second contact point γ in the center line C1 direction.

Figure 5:
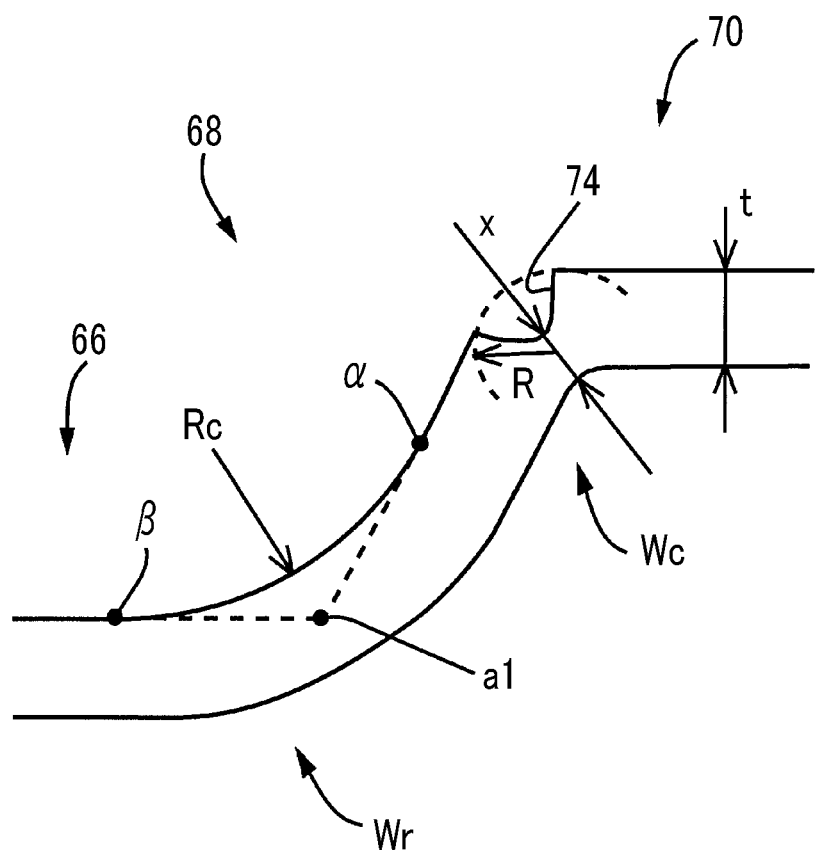
FIG. 5 is a diagram in which the section of the first tapered pipe portion including the circumferential direction notch of the propeller shaft illustrated in FIG. 3 is illustrated as an example and in an enlarged manner.

FIG. 5 is an enlarged cross-sectional view of the small diameter pipe portion 66, the large diameter pipe portion 70, and the first tapered pipe portion 68 along the V-V plane illustrated in FIG. 3. Although the small diameter pipe portion 66, the large diameter pipe portion 70, and the first tapered pipe portion 68 have substantially the same plate thickness t as the small diameter pipe portion 66, the large diameter pipe portion 70, and the first tapered pipe portion 68 are regarded as a curve formed of a common pipe-shaped member, the notch portion 74 formed on the outer periphery of the end portion of the first tapered pipe portion 68 on the large diameter pipe portion 70 side has a notch portion plate thickness x smaller than the plate thickness of the other part. The outer peripheral side boundary part between the large diameter pipe portion 70 and the first tapered pipe portion 68 takes the form of a curve that has a curvature radius R as indicated by a dashed line. The outer shape from the first contact point β of the small diameter pipe portion 66 to the first midpoint cα of the first tapered pipe portion 68 takes the form of a curve that has the curvature radius of the circumscribed radius Rc illustrated in FIG. 4.

A compressive stress p (MPa) resulting from the vehicular propeller shaft 22 receiving a compressive load Fc (kN) illustrated in FIG. 1 during a collision of the vehicle in the forward direction or the reverse direction of the vehicle 10 and a torsional stress r (MPa) resulting from a rotational torque Tr (kNm) during driving of the vehicle are calculated at each part of the vehicular propeller shaft 22. During compression of the vehicular propeller shaft 22, plastic deformation and buckling are initiated in a place where the compressive stress p in the vehicular propeller shaft 22 resulting from the compression shows a maximum value, that is, at a compressive load weakest part Wc, plastic deformation is initiated in a place where the torsional stress r in the vehicular propeller shaft 22 resulting from the rotational torque Tr transmitted by the rotation of the vehicular propeller shaft 22 during the driving shows a maximum value, that is, at a torsional load weakest part Wr, and the rotational torque capacity during the driving of the vehicle is limited by the part.

The propeller shaft intermediate portion 34 is designed such that plastic deformation and buckling of either end portion side of the first tapered pipe portion 68 is initiated by the compressive load Fc (kN) being received and the axial load in the traveling direction of the vehicle 10 is reduced as a result. In the propeller shaft intermediate portion 34 formed to have the constant plate thickness t, for example, plastic deformation resulting from the rotational torque Tr is initiated on either end portion side of the first tapered pipe portion 68. The compressive stress p and the torsional stress r generated in each of the large diameter pipe portion 70, the first tapered pipe portion 68, and the small diameter pipe portion 66 in a case where the compressive load Fc and the rotational torque Tr are applied to the propeller shaft intermediate portion 34 are calculated by three-dimensional stress analysis such as finite element method-based three-dimensional stress distribution analysis being performed. As far as the compressive load Fc used in the stress distribution analysis is concerned, the compressive stress p generated in each portion of the propeller shaft intermediate portion 34 is calculated by a yield load Fy (kN) of a similar product already mounted in the vehicle being experimentally obtained and the value that is obtained being used as the compressive load Fc. The same applies to the rotational torque Tr. The torsional stress r generated in each portion of the propeller shaft intermediate portion 34 is calculated by a yield torque Ty (kNm) of a similar product being experimentally obtained and the value that is obtained being used as the rotational torque Tr.

The stress distribution analysis is performed by four elements from a first element to a fourth element being used as elements that have main shapes for stress distribution calculation. The plate thickness t is a predetermined plate thickness t planned to be used. The first element is the angle between the rotational central axis of the vehicular propeller shaft 22 and a tangent passing through the part of the first tapered pipe portion 68 that forms a straight line or the first midpoint α in the curve portion of the first tapered pipe portion 68, that is, the inflection point. In other words, the first element is the first taper angle a. The second element is a pipe compression rate b at which the small diameter pipe portion outer diameter φS and the large diameter pipe portion outer diameter φL satisfy 1−(small diameter pipe portion outer diameter φs/large diameter pipe portion outer diameter φL). The third element is the ratio between the curvature radius R that is indicated by the dashed line at the outer peripheral side boundary part between the large diameter pipe portion 70 and the first tapered pipe portion 68 in FIG. 5, that is, in the notch portion 74 and the circumscribed radius Rc that forms the outer peripheral side boundary part between the small diameter pipe portion 66 and the first tapered pipe portion 68. In other words, the third element is a pipe compression portion R rate c, which is the ratio (R/Rc) between the curvature radius R and the circumscribed radius Rc. The fourth element is a notch rate d, which is the ratio (x/t) between the notch portion plate thickness x and the plate thickness t.

FIG. 6 shows the result of the calculation of the compressive stress p and the torsional stress r that is obtained by the three-dimensional analysis being used and by the first to fourth elements being changed, that is, by the first taper angle a, the pipe compression rate b, the pipe compression portion R rate c, and the notch rate d being changed. The compressive stress p is the internal stress that is generated in the propeller shaft intermediate portion 34 during compression, and the torsional stress r is the internal stress that is generated in the propeller shaft intermediate portion 34 during torsion. The maximum value of the internal stress that is generated in the propeller shaft intermediate portion 34 is generated in either the end portion of the first tapered pipe portion 68 on the small diameter pipe portion 66 side or the end portion of the first tapered pipe portion 68 on the large diameter pipe portion 70 side. Accordingly, in FIG. 6, the end portion of the first tapered pipe portion 68 on the small diameter pipe portion 66 side is illustrated as a small diameter side and, likewise, the end portion of the first tapered pipe portion 68 on the large diameter pipe portion 70 side is illustrated as a large diameter side. Illustrated in FIG. 6 are the compressive stress p and the torsional stress r in the end portion of the first tapered pipe portion 68 of the propeller shaft intermediate portion 34 on the small diameter pipe portion 66 side and the end portion of the first tapered pipe portion 68 of the propeller shaft intermediate portion 34 on the large diameter pipe portion 70 side in samples of the first to fourth elements divided into 16 different combinations. aa and ab as two conditions are selected as the first taper angle a, b1 and b2 are selected as the pipe compression rate b, c1 and c2 are selected as the pipe compression portion R rate c, and d1 and d2 are selected as the notch rate d. The number of the conditions of each element is not particularly limited to two and can also be, for example, three. Especially, the number of the different combinations of the first to fourth elements does not have to be limited to 16 and, for example, the number of the elements can be increased or decreased or the number of the combinations of the elements can be changed to 32, 64, 128, and so on.

The small diameter side p11 and the large diameter side p12 in the maximum compressive stress column that are indicated by, for example, Sample Number 1 in FIG. 6 show the result of the three-dimensional analysis-based calculation of the compressive stress p in a case where the compressive load Fc corresponding to the experimentally obtained yield load of a similar product is applied to the shape of Sample Number 1, and whichever is larger shows a maximum compressive stress. Desirably, the maximum compressive stress p12 generated on the large diameter side exceeds the maximum compressive stress p11 generated on the small diameter side in a case where the compressive load Fc is applied. In other words, it is desirable that breaking occurs on the large diameter side in a case where the compressive load Fc is applied. Accordingly, during the determination, a case where the compressive stress p generated on the large diameter side exceeds the compressive stress p generated on the small diameter side is regarded as appropriate and an o mark is shown as a determination result in that case. A case where the compressive stress p generated on the large diameter side does not exceed the compressive stress p generated on the small diameter side is regarded as inappropriate and no signal is shown with the column remaining empty in that case. In Sample Number 1, the maximum compressive stress p11 generated on the small diameter side exceeds the maximum compressive stress p12 generated on the large diameter side, and thus a determination as inappropriate is made. Regarding maximum torsional stresses, it is desirable that a maximum torsional stress r11 generated on the small diameter side exceeds a maximum torsional stress r12 generated on the large diameter side in a case where the rotational torque Tr is applied. In other words, it is desirable that breaking occurs on the small diameter side in a case where the rotational torque Tr is applied. Accordingly, during the determination, a case where the maximum torsional stress r11 generated on the small diameter side exceeds the maximum torsional stress r12 generated on the large diameter side is regarded as appropriate and an o mark is shown as a determination result in that case. A case where the torsional stress r generated on the large diameter side does not exceed the torsional stress r generated on the small diameter side is regarded as inappropriate and no signal is shown with the column remaining empty in that case.

An inequality representing a condition in which breaking occurs on the large diameter side as the compressive load weakest part Wc is expressed by the following Formula (1) once an appropriate maximum compressive stress condition is calculated by, for example, response surface methodology being used based on the first to fourth elements, that is, the first taper angle a, the pipe compression rate b, the pipe compression portion R rate c, and the notch rate d in the conditions in the maximum compressive stress column in FIG. 6 that are determined as appropriate, that is, Sample Numbers 2, 4, 6, 8, 10, 11, 12, 13, 14, 15, and 16. As long as Formula (1) is satisfied even in a case where the notch rate d is 1, that is, no notch is present, the large diameter pipe side end portion of the first tapered pipe portion 68, that is, the large diameter side can be the compressive load weakest part Wc.

$$0 < 1.95 + 0.0880 \times a + 708 \times b - 96.7 \times c + 232 \times d - 8.79 \times a \times b + 0.562 \times a \times c + 0.0150 \times a \times d + 188 \times b \times c - 560 \times b \times d - 1.0 \times c \times d \qquad 1$$

An inequality representing a condition in which breaking occurs in the small diameter pipe side end portion of the first tapered pipe portion 68, that is, the small diameter side as the torsional load weakest part Wr is expressed by the following Formula (2) once an appropriate maximum torsional stress condition is calculated by, for example, response surface methodology being used based on the first to fourth elements, that is, the first taper angle a, the pipe compression rate b, the pipe compression portion R rate c, and the notch rate d in the conditions in the maximum torsional stress in FIG. 6 that are determined as appropriate, that is, Sample Numbers 1, 2, 3, 4, 5, 6, 7, 9, 11, 13, and 15.

$$0 < -627 + 7.63 \times a + 3{,}420 \times b - 18.6 \times c + 8.84 \times d - 44.5 \times a \times b + 5.11 \times a \times c + 9.25 \times a \times d - 402 \times b \times c - 2{,}100 \times b \times d - 728 \times c \times d \qquad 2$$

According to the first example, plastic deformation of the large diameter pipe side end portion of the first tapered pipe portion 68, that is, the part where the notch portion 74 is installed as the compressive load weakest part Wc with respect to a force in the axial direction of the center line C1 of the vehicular propeller shaft 22 generated during a collision in the straight traveling direction of the vehicle 10 is initiated once the first taper angle a, the pipe compression rate b, the pipe compression portion R rate c, and the notch rate d are set within the range of Formula (1) above and plastic deformation of the small diameter pipe side end portion of the first tapered pipe portion 68 as the torsional load weakest part Wr with respect to the rotational torque Tr of the vehicular propeller shaft 22, that is, torque in a drive force transmission direction is initiated once the first taper angle a, the pipe compression rate b, the pipe compression portion R rate c, and the notch rate d are set within the range of Formula (2) above. As a result, a breaking place based on the compressive load Fc of the vehicular propeller shaft 22, that is, the compressive load weakest part Wc and a breaking place based on the rotational torque Tr of the vehicular propeller shaft 22, that is, the torsional load weakest part Wr can be apart from each other in the radial direction. Accordingly, safety can be improved based on a decrease in the axial load at which plastic deformation and buckling of a place determined in advance during a collision of the vehicle 10 are initiated and the rotational torque capacity needed during driving of the vehicle 10, that is, the allowed rotational torque Tr can be sufficiently maintained at the same time.

Another example of the present disclosure will be described below. In the following description, the same reference numerals as in the example described above will be used to refer to common parts, and description thereof will be omitted.

Second Example

Figure 7:
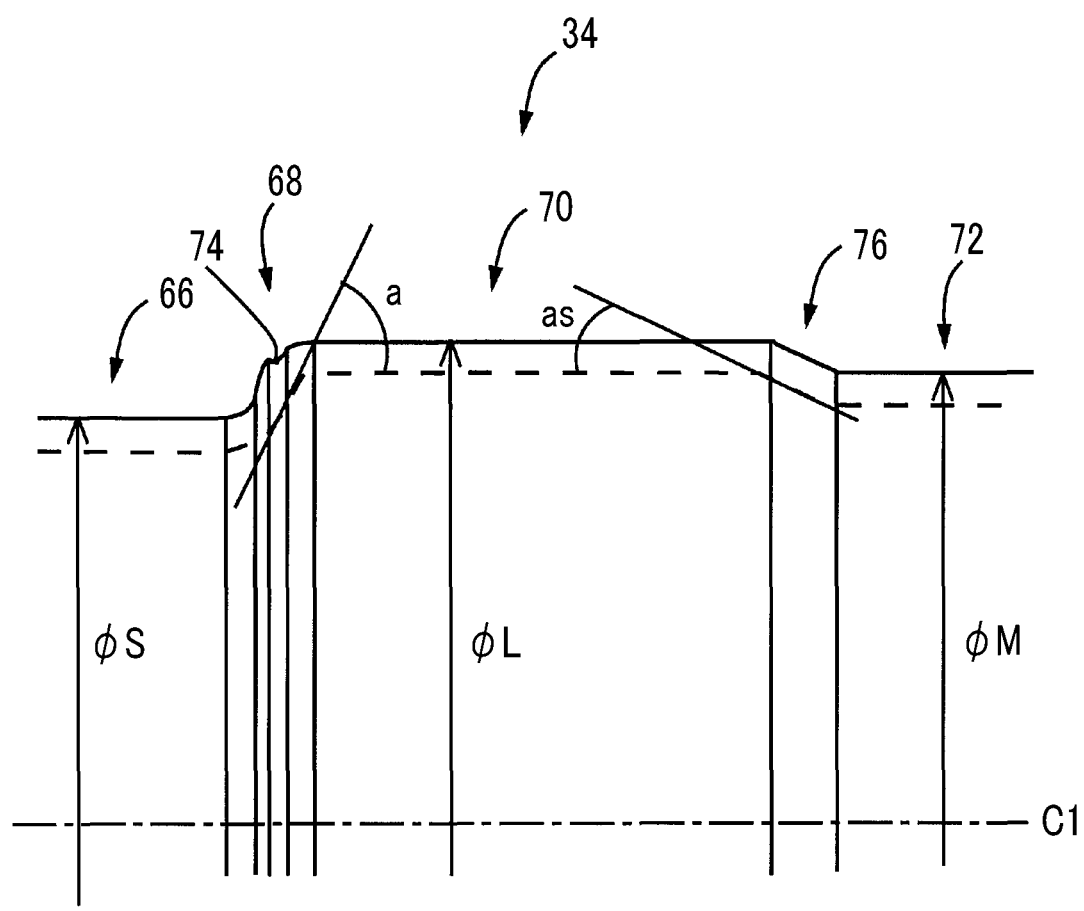
FIG. 7 is a diagram illustrating another example of the pipe-shaped member used in the propeller shaft illustrated in FIG. 2.

The compressive load weakest part Wc with respect to a force in the axial direction of the vehicular propeller shaft 22 and the torsional load weakest part Wr with respect to a force in the circumferential direction of the vehicular propeller shaft 22 are calculated based on the shapes of the small diameter pipe portion 66, the first tapered pipe portion 68, and the large diameter pipe portion 70 in the example described above and the example described above is applicable in the propeller shaft intermediate portion 34 in which, for example, the outer diameter $\phi L$ of the large diameter pipe portion 70 is almost equal to the outer diameter of the propeller shaft rear portion 36 and the outer diameter $\phi S$ of the small diameter pipe portion 66 is almost equal to the outer diameter of the propeller shaft front portion 32. Meanwhile, in a vehicular propeller shaft 22 according to a second example illustrated in FIG. 7, the propeller shaft intermediate portion 34 is further provided with a medium diameter pipe portion 72 that has an outer diameter $\phi M$ which exceeds the outer diameter φS of the small diameter pipe portion 66 and is smaller than the outer diameter φL of the large diameter pipe portion 70 and the second tapered pipe portion 76 that connects the large diameter pipe portion 70 and the medium diameter pipe portion 72 to each other on the large diameter pipe portion side of the propeller shaft intermediate portion 34 composed of the small diameter pipe portion 66, the first tapered pipe portion 68, and the large diameter pipe portion 70 and a second taper angle as between the center line C1 of the vehicular propeller shaft 22 and a part of the second tapered pipe portion 76 forming a straight line or a tangent to an inflection point in a curve portion of the second tapered pipe portion 76 is smaller than the first taper angle a. Although an outer shape is formed by the intersection point resulting from the straight lines of the medium diameter pipe portion 72 and the second tapered pipe portion 76 and the intersection point resulting from the straight lines of the second tapered pipe portion 76 and the large diameter pipe portion 70 in FIG. 7, the outer shape may also be formed by a curve including a predetermined arc at each of the intersection points.

According to the second example, the outer diameter φL of the large diameter pipe portion 70 is allowed to exceed, for example, the outer diameter of the propeller shaft rear portion 36 and the outer diameter φL of the large diameter pipe portion 70 is allowed to be larger than in a case where the large diameter pipe portion 70 is directly connected to the propeller shaft rear portion 36. Accordingly, the axial load at which plastic deformation and buckling of a planned breaking place, that is, the compressive load weakest part Wc during a collision of the vehicle 10 are initiated can be further decreased. Therefore, safety can be further enhanced.

Although examples of the present disclosure have been described above with reference to the drawings, the present disclosure is applied to other aspects as well.

Although the notch portion 74 is continuously formed in the circumferential direction of the vehicular propeller shaft 22 in the end portion of the first tapered pipe portion 68 on the large diameter pipe portion 70 side in the example described above, the continuous formation is optional and effects similar to those of the example can still be anticipated even in a case where, for example, the notch portion is partially provided in the circumferential direction and the notch portion is intermittently formed.

Although the example described above relates to a hybrid vehicle that has the engine 12 and the motor generator 14 as drive force sources, the example described above is not particularly limited to a hybrid vehicle and is also applicable in FR vehicles in which a gasoline engine, a diesel engine, the motor generator 14, or the like is used as a single drive force source.

The torque converter 16 is optional although the torque converter 16 and the automatic transmission 18 are used in the example described above. Any transmission can be used as the automatic transmission 18 and examples thereof include a stepped automatic transmission and a belt type continuously variable transmission that has a transmission belt wrapped around between a pair of variable pulleys.

Although the small diameter pipe portion 66 is fixed and welded to the propeller shaft front portion 32 and the large diameter pipe portion 70 or the medium diameter pipe portion 72 is fixed and welded to the propeller shaft rear portion 36 in the example described above, similar effects can still be anticipated even when the small diameter pipe portion 66 is fixed and welded to the propeller shaft rear portion 36 and the large diameter pipe portion 70 or the medium diameter pipe portion 72 is fixed and welded to the propeller shaft front portion 32 unlike in the example described above.

The above description is merely an embodiment, and the present disclosure can be implemented in various aspects modified and improved based on the knowledge of those skilled in the art.

What is claimed is:

1. A vehicular propeller shaft configured to transmit a rotational force output from a drive force source to drive wheels, the vehicular propeller shaft comprising:
    a stepped pipe-shaped member including a compressive load weakest part with respect to an axial compressive load of the vehicular propeller shaft; and
    a torsional load weakest part with respect to a torsional load around an axis of the vehicular propeller shaft, the compressive load weakest part and the torsional load weakest part being positioned apart from each other in a radial direction of the stepped pipe-shaped member, wherein:
    the stepped pipe-shaped member includes
        a small diameter pipe portion having a predetermined outer diameter,
        a large diameter pipe portion having an outer diameter exceeding the outer diameter of the small diameter pipe portion, and
        a first tapered pipe portion connecting the small diameter pipe portion and the large diameter pipe portion to each other;
    the compressive load weakest part is positioned on the large diameter pipe portion side of the first tapered pipe portion; and
    the torsional load weakest part is positioned on the small diameter pipe portion side of the first tapered pipe portion.

2. The vehicular propeller shaft according to claim 1, wherein a groove-shaped circumferential direction notch disposed in an outer peripheral surface of the first tapered pipe portion on the large diameter pipe portion side constitutes the compressive load weakest part.

3. The vehicular propeller shaft according to claim 2, wherein the stepped pipe-shaped member is configured to satisfy the following Formula 1 and Formula 2 in a plane including a center line of the vehicular propeller shaft, $$0<1.95+0.0880 \times a+708 \times b-96.7 \times c+232 \times d-8.79 \times a \times b+ \\ 0.562 \times a \times c+0.0150 \times a \times d+188 \times b \times c-560 \times b \times d- \\ 1.0 \times c \times d \qquad 1$$

$$0<-627+7.63 \times a+3{,}420 \times b-18.6 \times c+8.84 \times d-44.5 \times a \times \\ b+5.11 \times a \times c+9.25 \times a \times d-402 \times b \times c-2{,}100 \times b \times d- \\ 728 \times c \times d \qquad 2$$

in which a represents a first taper angle as an angle between the center line of the vehicular propeller shaft and a part of the first tapered pipe portion forming a straight line or a tangent to an inflection point in a curve portion of the first tapered pipe portion, b represents a pipe compression rate determined as 1−(small diameter pipe portion outer diameter/large diameter pipe portion outer diameter), c represents a pipe compression portion R rate determined as boundary portion radius/circumscribed radius, the boundary portion radius is a curvature radius of a boundary portion arc circumscribing a straight line showing an outer peripheral surface of the large diameter pipe portion and a curve showing the outer peripheral surface of the first tapered pipe portion, the circumscribed radius is a curvature radius of an arc circumscribing a first midpoint and a first contact point, the first midpoint is a midpoint between a base point and a first intersection point when an intersection point between the tangent to the first tapered pipe portion and an extension line of a straight line showing an outer peripheral surface of the small diameter pipe portion is the base point and an intersection point between the tangent to the first tapered pipe portion and an extension line of the straight line showing the outer peripheral surface of the large diameter pipe portion is the first intersection point, the first contact point is a point apart from the base point toward the outer peripheral surface of the small diameter pipe portion by a length from the base point to the first midpoint, and d represents a notch rate determined as a plate thickness of the circumferential direction notch/a plate thickness of the stepped pipe-shaped member other than the circumferential direction notch.

4. The vehicular propeller shaft according to claim 1, wherein:

the stepped pipe-shaped member includes a medium diameter pipe portion having an outer diameter exceeding the outer diameter of the small diameter pipe portion and smaller than the outer diameter of the large diameter pipe portion and a second tapered pipe portion connecting the large diameter pipe portion and the medium diameter pipe portion to each other on the large diameter pipe portion side;

a second taper angle of the stepped pipe-shaped member is smaller than the first taper angle;

the first taper angle is an angle between the center line of the vehicular propeller shaft and the part of the first tapered pipe portion forming the straight line or the tangent to the inflection point in the curve portion of the first tapered pipe portion; and the second taper angle is an angle between the center line of the vehicular propeller shaft and a part of the second tapered pipe portion forming a straight line or the tangent to the inflection point in a curve portion of the second tapered pipe portion.

* * * * *